(12) United States Patent
Okada et al.

(10) Patent No.: US 6,169,768 B1
(45) Date of Patent: Jan. 2, 2001

(54) RECEIVING APPARATUS AND METHOD

(75) Inventors: Takahiro Okada, Chiba; Osamu Ito; Tamotsu Ikeda, both of Tokyo, all of (JP)

(73) Assignee: Sony Corporation (JP)

( * ) Notice: Under 35 U.S.C. 154(b), the term of this patent shall be extended for 0 days.

(21) Appl. No.: 09/070,206

(22) Filed: Apr. 30, 1998

(30) Foreign Application Priority Data

May 2, 1997 (JP) .................................................. 9-114714

(51) Int. Cl.[7] .................................................. H04L 27/06
(52) U.S. Cl. .................................................. 375/316; 375/340
(58) Field of Search .................................................. 375/260, 316, 375/340, 283, 330, 331, 329; 370/206, 210

(56) References Cited

U.S. PATENT DOCUMENTS

| | | | |
|---|---|---|---|
| 5,471,464 | 11/1995 | Ikeda | 370/208 |
| 5,771,224 | * 6/1998 | Seki et al. | 370/206 |

FOREIGN PATENT DOCUMENTS

| | | |
|---|---|---|
| 0 653 858 A2 | 5/1995 | (EP) . |
| WO 92/05646 | 4/1992 | (WO) . |
| WO 92/10043 | 6/1992 | (WO) . |
| WO 95/20848 | 8/1995 | (WO) . |

* cited by examiner

*Primary Examiner*—Tesfaldet Bocure
(74) *Attorney, Agent, or Firm*—Lerner, David, Littenberg, Krumholz & Mentlik, LLP

(57) ABSTRACT

A multiplication circuit is removed from a receiving apparatus which receives an orthogonally modulated information sequence. The real-number part and the imaginary-number part of a transmission parameter converted into a frequency range are input to hard determination circuits, respectively. The hard determination circuits convert the respective components into 1-bit data in accordance with a predetermined threshold value. Differential decoding circuits differentially decode the real-number part and the imaginary-number part which are converted into 1-bit data, respectively, and output the obtained data to cumulative addition circuits. The cumulative addition circuits cumulatively add the differentially demodulated data and supply it to identification-distance measurement circuits, respectively, and also to a selector. The identification-distance measurement circuits determine the identification distance, cause the selector to select the components with a greater distance and to supply them to a majority decision circuit. The majority decision circuit makes a majority decision of the data selected by the selector.

12 Claims, 14 Drawing Sheets

US 6,169,768 B1

RECEIVING APPARATUS AND METHOD

BACKGROUND OF THE INVENTION

1. Field of the Invention

The present invention relates to a receiving apparatus and a receiving method and, more particularly, to a receiving apparatus and a method for receiving an orthogonally modulated information sequence.

2. Description of the Related Art

As a digital modulation method, PSK (Phase Shift Keying), QAM (Quadrature Amplitude Modulation), which assign information to phase and amplitude, and the like, are often used.

Meanwhile, as these digital modulation methods, there is a single-carrier method for modulating a single-carrier wave by a method such as that described above and transmitting it, and a multicarrier method for modulating a plurality of carrier waves and transmitting them.

In the single-carrier transmission method, a single-carrier wave is modulated by PSK, QAM, and the like, and transmitted. In comparison, in the multicarrier transmission, a plurality of carrier waves which are formed into a narrower band are modulated by the above-described PSK, QAM, and the like, and transmitted. In the multicarrier transmission method, since the band width of each carrier wave is narrower than that of the single-carrier transmission method, it is possible to suppress the amplitude and the delay deviation within each carrier-wave band to a small amount even in an environment with frequency selective phasing, and therefore, it is possible to suppress deterioration of the bit error rate.

FIG. 9 shows an example of the construction of the transmission apparatus of the multicarrier transmission method. A serial/parallel (hereinafter, referred to as S/P) conversion circuit 2 converts input serial data (data to be transmitted) 1 into parallel data. D/A (Digital to Analog) conversion circuits 3 to 6 convert output data of the S/P conversion circuit 2 into corresponding analog signals.

LPFs (Low Pass Filters) 7 to 10 remove unwanted high-frequency components contained in the output of the D/A conversion circuits 3 to 6. Orthogonal conversion circuits 11 to 14 orthogonally convert the output of the LPFs 7 to 10 in accordance with the signals of frequencies $f_1$ to $f_4$ output from local oscillation circuits 15 to 18, respectively.

The local oscillation circuits 15 to 18 output signals of frequencies $f_1$ to $f_4$ and supply them to the orthogonal conversion circuits 11 to 14, respectively. BPFs (Band Pass Filters) 19 to 22 perform a band limitation on the output of the orthogonal conversion circuits 11 to 14, respectively, and supply the obtained signals to an addition circuit 23. The addition circuit 23 adds together the output of the BPFs 19 to 22 and generates a multicarrier signal.

The BPF 24 appropriately shapes the spectrum of the output signal of the addition circuit 23 and then outputs it to an RF converter 25. The RF converter 25 converts the frequency band of a multicarrier signal output from the BPF 24 into an RF band and then sends it from an antenna 26.

FIG. 10 shows an example of the construction of a receiving apparatus of the multicarrier transmission method. In this figure, an antenna 32 receives an RF signal transmitted from the antenna 26 of a transmission apparatus shown in FIG. 9. An IF converter 33 converts the RF signal received by the antenna 32 into an IF (intermediate frequency) band signal.

A wave-branching circuit 34 separates and extracts each carrier-wave component from the IF signal. BPFs 35 to 38 perform band limitation on each carrier wave output from the wave-branching circuit 34 and extracts a carrier wave having each of the center frequencies of $f_1$ to $f_4$.

Orthogonal demodulation circuits 39 to 42 multiply signals output from the local oscillation circuits 43 to 46 with signals output from the BPFs 35 to 38, respectively, and demodulate them into respective baseband signals. The local oscillation circuits 43 to 46 generate signals of a frequency $f_1$ to $f_4$ and supply them to the orthogonal demodulation circuits 39 to 42, respectively.

LPFs 47 to 50 remove unwanted high-frequency components from the baseband signals output from the orthogonal demodulation circuits 39 to 42. A/D (Analog to Digital) conversion circuits 51 to 54 convert output signals of the LPFs 47 to 50 into digital signals.

A parallel/serial (hereinafter, referred to as P/S) conversion circuit 55 converts parallel signals output from the A/D conversion circuits 51 to 54 into a serial signal and outputs it as a received digital signal 56.

In the above multicarrier transmission method, only one carrier wave (carrier) is assigned to one frequency. However, in order to enhance the use efficiency of frequency, a method in which each carrier is formed of two subcarriers with different phases (perpendicular to each other along the frequency axis) has been proposed.

FIG. 11 shows a transmission apparatus based on what is commonly called an OFDM (Orthogonal Frequency Division Multiplexing) in which subcarriers are placed so as to be perpendicular to each other along the frequency axis.

In this figure, a mapping circuit 62 converts a digital input signal 61 into a corresponding same phase (I) component and an orthogonal (Q) component in accordance with a modulation method, such as QPSK or 16QAM. An IDFT (Inverse Discrete Fourier Transform) circuit 63 converts data converted into a predetermined signal point by the mapping circuit 62 into a signal in the time domain.

Memories 64 and 65 add a guard interval indicating the beginning and end of each symbol to the signal in the time domain output from the IDFT circuit 63. D/A conversion circuits 66 and 67 convert the signal in the time domain to which the guard interval is added into a corresponding analog signal.

LPFs 68 and 69 remove folded components (high-frequency components) which occur by D/A conversion, and then output them to an orthogonal modulation circuit 70. The orthogonal modulation circuit 70 orthogonally modulates the output signal of the LPFs 68 and 69 in accordance with the signal of a frequency $f_1$ supplied from a local oscillation circuit 71.

A BPF 72 extracts only the signal in the intermediate frequency (IF) band from the output signal of the orthogonal modulation circuit 70. An RF converter 73 converts the signal in the IF band into a signal in the RF band, and then transmits it from an antenna 74.

FIG. 12 is a view illustrating an example of the construction of a receiving apparatus for receiving information transmitted from the transmission apparatus of the OFDM method shown in FIG. 11.

In this figure, an IF converter 83 frequency-converts the signal in the RF band received by an antenna 82 into a signal in the IF band. An orthogonal demodulation circuit 84 orthogonally demodulates the signal output from the IF converter 83 in accordance with the signal of a frequency $f_1$, supplied from a local oscillation circuit 85.

LPFs 86 and 87 remove unwanted high-frequency components contained in the output signals of the orthogonal demodulation circuit 84. A/D conversion circuits 88 and 89 convert signals output from the LPFs 86 and 87 into corresponding digital signals and supply them to a DFT (Discrete Fourier Transform) circuit 90.

The DFT circuit 90 converts the digital signals output from the A/D conversion circuits 88 and 89 into signals in the frequency range and outputs them to a demapping circuit 91.

The demapping circuit 91 reproduces the original digital data from the I components and the Q components which are converted into the frequency range and outputs it as received data 92.

In such an OFDM method as above, since each carrier wave is formed of two subcarriers whose carrier waves are perpendicular to each other, the use efficiency of frequency can be enhanced.

Meanwhile, with an increase in types of communication configuration and broadcasting configuration, a transmission method capable of appropriately changing a modulation method and an error correction method in accordance with the amount and quality of information to be transmitted has come to be proposed. In such a method, it is common that a transmission parameter describing a modulation method and an error correction method to be used is transmitted together with data, and on the receiving side, appropriate modulation and error correction are performed in accordance with the transmission parameter.

FIG. 13 shows an example of a transmission parameter used in the OFDM method. As shown in this figure, a transmission parameter is assigned to a total of five, the zero, fifth, tenth, fifteenth, and twentieth carrier waves, from among a total of 25 effective carrier waves which form a 1OFDM symbol, and transmission data is assigned to the other carrier waves. On the receiving side, since a method for demodulating a data carrier wave is determined in accordance with the transmission parameter, the transmission-parameter carrier wave is required to have a noise tolerance higher than that of the data carrier wave.

FIG. 14 is a block diagram showing an example of the construction of a transmission apparatus of an OFDM method capable of transmitting a transmission parameter. In this example, the transmission parameter has been modulated by differential BPSK (Binary Phase Shift Keying), and all the transmission-parameter carrier waves transmit the same information. Such a method is also used in the European digital ground-wave broadcast. In this figure, components corresponding to those of FIG. 11 are given the same reference numerals and therefore, a description thereof has been omitted.

In this figure, in comparison with the case of FIG. 11, a differential modulation circuit 102 and a multiplexer (hereinafter, referred to as MUX) 103 are newly added. The remaining construction is the same as in the case of FIG. 11.

The differential modulation circuit 102 performs differential modulation on an input transmission parameter 101. That is, the differential modulation circuit 102 assigns the information possessed by the input transmission parameter 101 as a phase difference between the current data and the data before the 1OFDM symbol.

The MUX 103 selects either the output of the mapping circuit 62 or the output of the differential modulation circuit 102, and assigns it to the subcarrier.

The data generated by the MUX 103 is supplied to the IDFT circuit 63 whereby it is converted into a signal in the time domain. Since the subsequent processing is the same as that of the case of FIG. 11, a description thereof has been omitted.

FIG. 15 is a block diagram showing an example of the construction of a receiving apparatus corresponding to the transmission apparatus shown in FIG. 14. In this figure, components corresponding to those of FIG. 12 are given the same reference numerals and therefore, a description thereof has been appropriately omitted.

In this figure, in comparison with the case of FIG. 12, a demultiplexer (hereinafter, referred to as DMUX) 111, a differential demodulation circuit 112, and a majority decision circuit 113 are newly added. The remaining construction is the same as in the case shown in FIG. 12.

The DMUX 111 separates and extracts the transmission data and the transmission parameter from the OFDM signal on which discrete Fourier transform has been performed by the DFT circuit 90 and supplies them to the demapping circuit 91 and the differential demodulation circuit 112, respectively.

The differential demodulation circuit 112 performs differential demodulation on the transmission parameter output from the DMUX 111 and outputs the obtained data to the majority decision circuit 113. That is, the differential demodulation circuit 112 computes the phase difference between the transmission parameter output newly from the DMUX 111 and the transmission parameter output before the 1OFDM symbol, and outputs the phase difference.

FIG. 16 shows a detailed example of the construction of the differential demodulation circuit 112. In this figure, a delay circuit 123 delays, by the period of the 1OFDM symbol, a real-number part (Re) 121 and an imaginary-number part (Im) 122 which form the transmission parameter output from the DMUX 111 and outputs them.

A multiplication circuit 124 multiplies the real-number part 121 of the transmission parameter which is newly output from the DMUX 111 with the real-number part 121 which is delayed by the period of the 1OFDM symbol by the delay circuit 123, and outputs it to an addition circuit 126.

The multiplication circuit 125 multiplies the imaginary-number part 122 of the transmission parameter which is newly output from the DMUX 111 with the imaginary-number part which is delayed by the period of the 1OFDM symbol by the delay circuit 123, and outputs it to an addition circuit 126.

The addition circuit 126 adds together the output of the multiplication circuits 124 and 125 and outputs it as a differential demodulation output 127. As a result, from the addition circuit 126, only the real-number part is output from the result such that the data before the 1OFDM symbol delayed by the delay circuit 123 and the data newly output from the DMUX 111 are complex-multiplied.

Referring back to FIG. 15, the majority decision circuit 113 makes a majority decision of the differential demodulation result of each carrier wave output from the differential demodulation circuit 112 and outputs the result as a transmission parameter 114.

As described above, since differential modulation is performed on the transmission side and differential demodulation is performed on the receiving side, information is reproduced in accordance with the relative difference between two adjacent OFDM symbols. Therefore, even in the case where, for example, the reproduction carrier wave has a deviation between the transmission side and the receiving side, it is possible to accurately reproduce the original information.

Meanwhile, in order to perform differential demodulation, the multiplication circuits 124 and 125 are required. To construct such a multiplication circuit by digital circuits, large circuit resources are required. As a result, problems arise, such as the scale of circuits being increased, and the process for development becoming complex.

SUMMARY OF THE INVENTION

An object of the present invention, which has been achieved in view of the above-described circumstances, is to reduce the scale of circuits of the OFDM receiving apparatus for receiving information containing a transmission symbol and to simplify the process for development.

To achieve the above-described object, according to one aspect of the present invention, there is provided a receiving apparatus comprising: receiving means for receiving an orthogonally modulated information sequence; demodulation means for orthogonally demodulating the information sequence received by the receiving means in accordance with predetermined orthogonal axes; selection means for selecting an axis with the highest likelihood by referring to the components of each axis contained in the information sequence demodulated by the demodulation means; and reproduction means for reproducing the information sequence by using the components corresponding to the axis selected by the selection means.

According to another aspect of the present invention, there is provided a receiving method comprising: a receiving step for receiving an orthogonally modulated information sequence; a demodulation step for orthogonally demodulating the information sequence received in the receiving step in accordance with predetermined orthogonal axes; a selection step for selecting an axis with the highest likelihood by referring to the components of each axis contained in the information sequence demodulated in the demodulation step; and a reproduction step for reproducing the information sequence by using the components corresponding to the axis selected in the selection step.

In the receiving apparatus in accordance with the present invention, an orthogonally modulated information sequence is received by receiving means, the information sequence received by the receiving means is orthogonally demodulated by the demodulation means in accordance with predetermined orthogonal axes, an axis with the highest likelihood is selected by selection means by referring to the components of each axis contained in the information sequence demodulated by the demodulation means, and the information sequence is reproduced by reproduction means by using the components corresponding to the axis selected by the selection means. For example, an information sequence modulated in accordance with a BPSK method is received by the receiving means, the information sequence received by the receiving means is orthogonally demodulated by the demodulation means in accordance with the orthogonal axes formed of the I axis and the Q axis, an axis with the highest likelihood is selected by the selection means by referring to the I-axis components and the Q-axis components contained in the orthogonally demodulated information sequence, and the original information sequence is reproduced by reproduction means by using the components corresponding to the axis selected by the selection means.

In the receiving method in accordance with the present invention, an orthogonally modulated information sequence information sequence is received in the receiving step, the information sequence received in the receiving step is orthogonally demodulated in the demodulation step in accordance with predetermined orthogonal axes, an axis with the highest likelihood is selected in the selection step by referring to the components of each axis contained in the information sequence which is demodulated in the demodulation step, and the information sequence is reproduced in the reproduction step by using the components corresponding to the axis selected in the selection step. For example, the information sequence modulated in accordance with a BPSK method is received in the receiving step, the information sequence received in the receiving step is orthogonally demodulated by the demodulation step in accordance with orthogonal axes formed of the I axis and the Q axis, an axis with the highest likelihood is selected in the selection step by referring to the I-axis components and the Q-axis components contained in the orthogonally demodulated information sequence, and the original information sequence is reproduced in the reproduction step by using the components corresponding to the axis selected by the selection step.

The above and further objects, aspects and novel features of the invention will become more apparent from the following detailed description when read in connection with the accompanying drawings.

DESCRIPTION OF THE PREFERRED EMBODIMENTS

Figure 1:
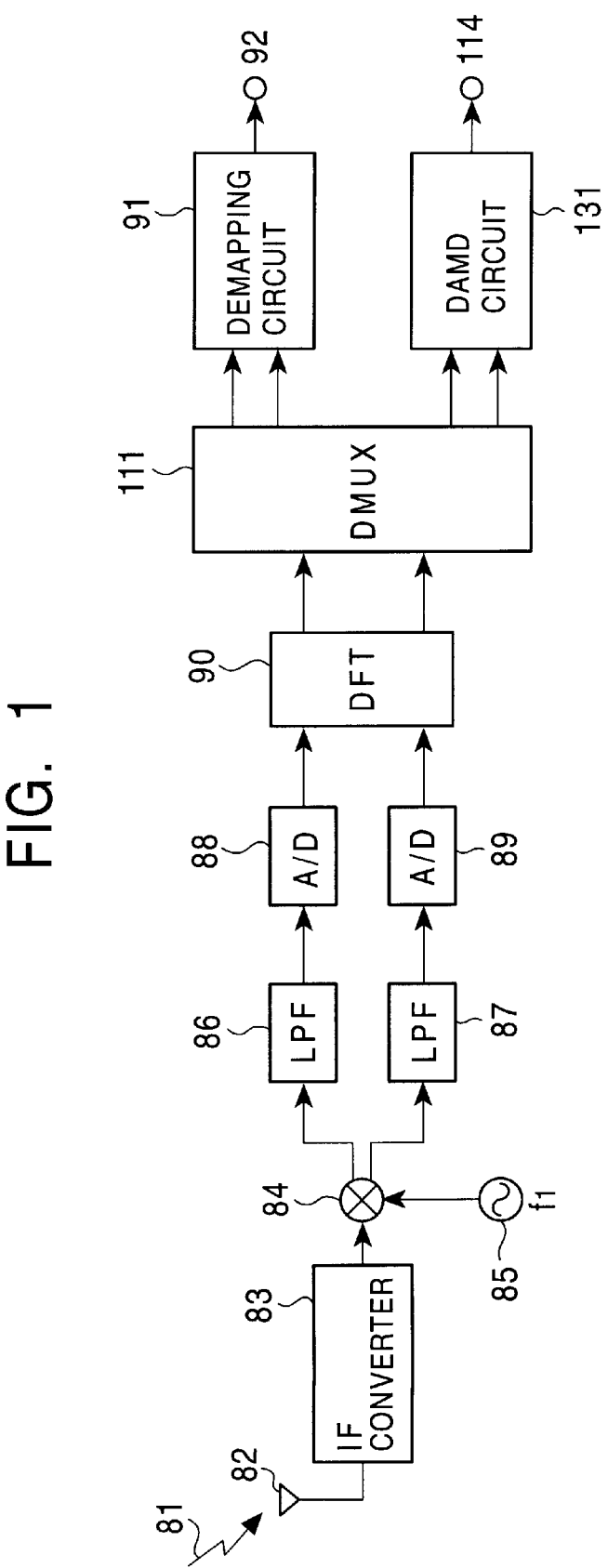
FIG. 1 is a block diagram illustrating an example of the construction of an embodiment.

FIG. 1 is a block diagram showing an example of the construction of an embodiment of the present invention. In this figure, components corresponding to those of FIG. 15 are given the same reference numerals and, therefore, a description thereof has been appropriately omitted. The construction of a transmission apparatus corresponding to this embodiment is the same as that in FIG. 14, and therefore, a description thereof has been omitted. A transmission parameter is assigned to the zero, fifth, tenth, fifteenth, and twentieth carrier waves, that is, these five types of carrier waves are formed by the same transmission parameter which is coded by differential BPSK.

In this embodiment, the differential demodulation circuit 112 and the majority decision circuit 113 have been removed from the example of the construction shown in FIG. 15, and instead, a DAMD circuit 131 is newly added. The remaining construction is the same as in the case of FIG. 15.

Figure 2:
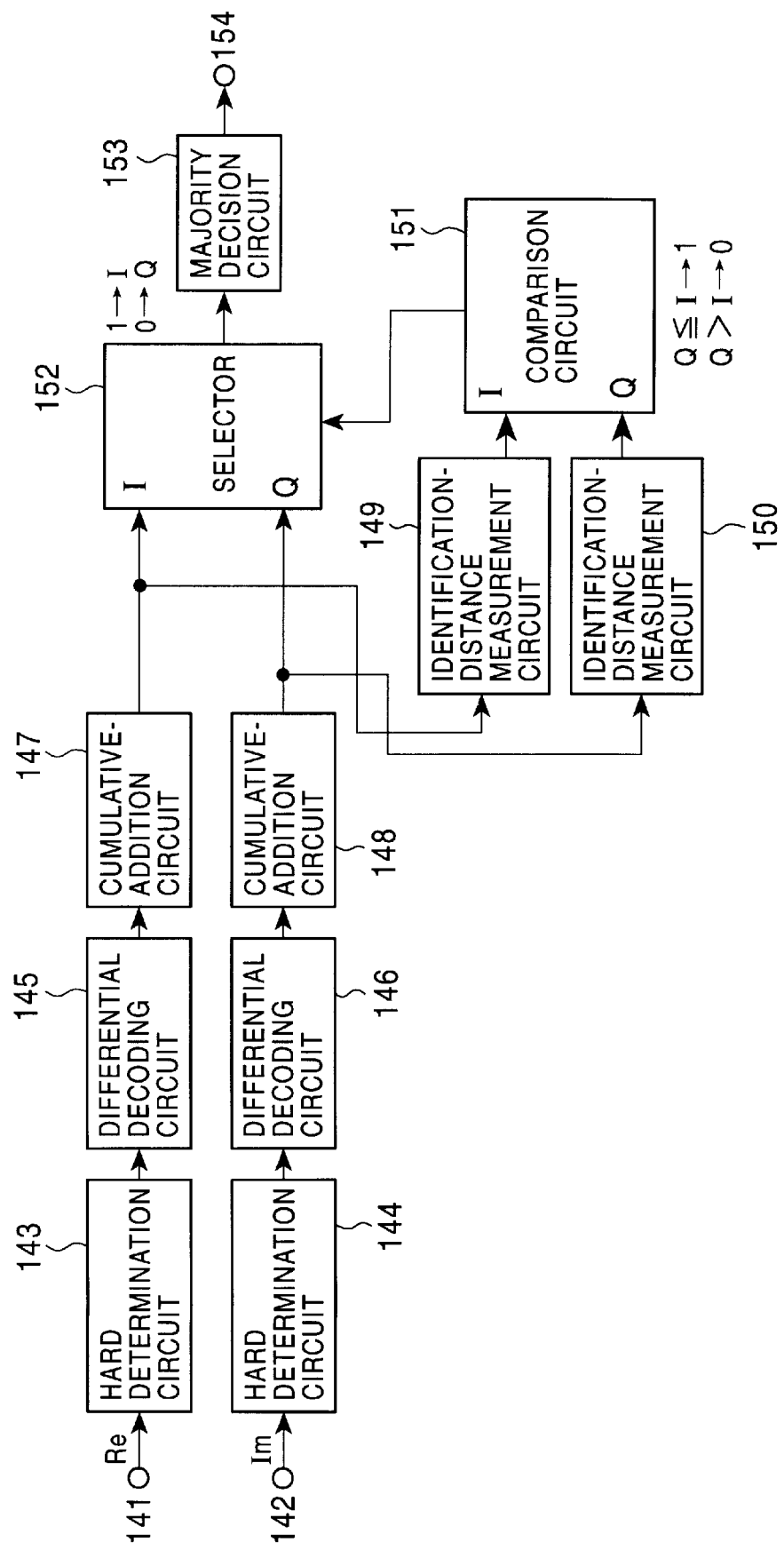
FIG. 2 is a block diagram illustrating a detailed example of the construction of a DMAD (Double Axis Majority Decision) circuit shown in FIG. 1.

FIG. 2 shows a detailed example of the construction of the DAMD circuit 131. In this figure, hard determination circuits 143 and 144 receive a real-number part 141 and an imaginary-number part 142 of the transmission parameter output from the DMUX 111, respectively, and perform a hard determination (a predetermined threshold value is applied to the input value and a determination of whether the input value is either 1 or 0 is performed), and supply the obtained result as 1-bit data to differential decoding circuits 145 and 146, respectively.

The differential decoding circuits 145 and 146 perform differential decoding on the data obtained as a result of the hard determination by the hard determination circuits 143 and 144. That is, the differential decoding circuits 145 and 146 compare the data before the 1OFDM symbol with the current data. When these data are different, a value "1" is output, and when these data are equal, a value "0" is output.

Figure 3:
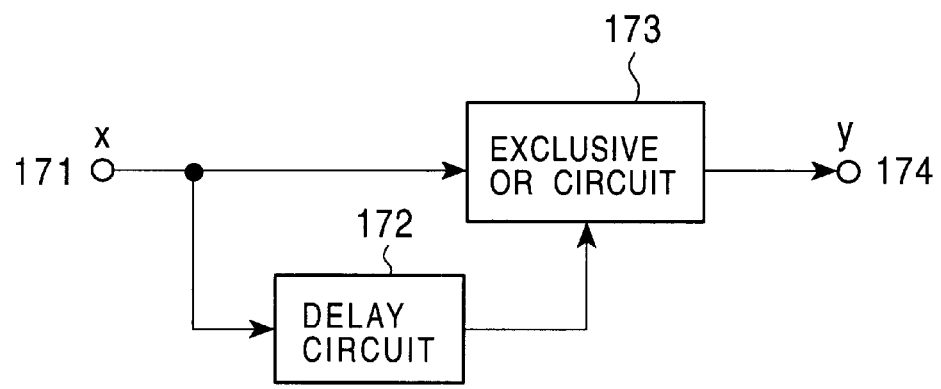
FIG. 3 is a block diagram illustrating a detailed example of the construction of a differential decoding circuit shown in FIG. 2.

FIG. 3 shows a detailed example of the construction of the differential decoding circuits 145 and 146. In this figure, a delay circuit 172 delays by the period of the 1OFDM symbol the data output from the hard determination circuits 143 and 144 and outputs it. An exclusive OR circuit 173 computes the exclusive OR of the data output from the hard determination circuit 143 or 144 and the data delayed by the period of the 1OFDM symbol by the delay circuit 172, and outputs the result. That is, when the two input data values are different, the exclusive OR circuit 173 outputs a value "1", and when the two data values are equal, the exclusive OR circuit 173 outputs a value "0".

Referring back to FIG. 2, cumulative addition circuits 147 and 148 perform cumulative addition of the data output from the differential decoding circuits 145 and 146 over the period of the 1OFDM symbol. Identification-distance measurement circuits 149 and 150 generate data (identification distance) for selecting the output value with a higher likelihood from among the output values of the cumulative addition circuits 147 and 148.

Figure 4:
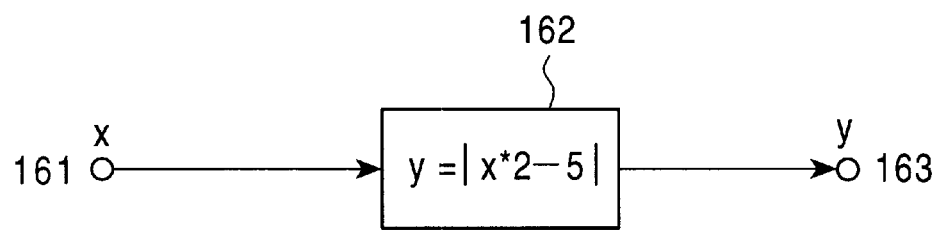
FIG. 4 is a block diagram showing a detailed example of the construction of an identification-distance measurement circuit shown in FIG. 2

FIG. 4 shows a detailed example of the construction of the identification-distance measurement circuits 149 and 150. As shown in this figure, an input x and an output y of the identification-distance measurement circuits 149 and 150 have the following relationship. Here, ABS () is a function which determines the absolute value within the parentheses.

$$y = ABS(x \times 2 - 5) \quad (1)$$

A comparison circuit 151 compares the values output from each of the identification-distance measurement circuits 149 and 150, and outputs a value "1" to a selector 152 when the output of the identification-distance measurement circuit 149 is greater than the output of the identification-distance measurement circuit 150, or when these outputs are equal (I≧Q). On the other hand, when the output of the identification-distance measurement circuit 149 is less than the output of the identification-distance measurement circuit 150 (I<Q), the comparison circuit 151 outputs a value "0" to the selector 152.

When the output of the comparison circuit 151 is "1" (in the case of I≧Q), the selector 152 selects the data output from the cumulative addition circuit 147 and supplies it to the majority decision circuit 153. Also, when the output of the comparison circuit 151 is "0" (in the case of I<Q), the selector 152 selects the data output from the cumulative addition circuit 148 and supplies it to the majority decision circuit 153.

The majority decision circuit 153 makes a decision of whether the value to be determined is "0" or "1" by referring to the output of the selector 152, and outputs the decision result.

Next, the operation of the foregoing embodiment will be described.

The RF signal transmitted from the transmission side is received by the antenna 82 and is converted into a signal in the intermediate band by the IF converter 83. Then, the signal is orthogonally demodulated by the orthogonal demodulation circuit 84, and the I-axis components and the Q-axis components are extracted. The I-axis components and the Q-axis components are converted into digital signals by the A/D conversion circuits 88 and 89, and then discrete Fourier transform is performed on the digital signals by the DFT circuit 90 so that the digital signals are converted into signals in the frequency range and supplied to the DMUX 111.

The real-number part 141 and the imaginary-number part 142 of the transmission parameter output from the DMUX 111 are supplied to the hard determination circuits 143 and 144, respectively. The hard determination circuits 143 and 144 make a determination (hard determination) of whether the input data is "0" or "1" by using a predetermined value (for example, 0.5) as a threshold value, and output the determination result as 1-bit data to the differential decoding circuits 145 and 146, respectively.

The differential decoding circuits 145 and 146 output the result obtained by computing the exclusive OR of the data before the 1OFDM symbol delayed by the delay circuit 172 and the output of the hard determination circuit 143 or 144 by the exclusive OR circuit 173. As a result, when these two data are equal, a value "0" is output, and when the two data are not equal, a value "1" is output.

The cumulative addition circuits 147 and 148 cumulatively add the outputs of the differential decoding circuits 145 and 146, respectively, over the period of the 1OFDM symbol, and output the obtained value to the identification-distance measurement circuits 149 and 150, respectively, and also to the selector 152.

Each of the identification-distance measurement circuits 149 and 150 generates data for selecting the outputs of the cumulative addition circuits 147 and 148 with a higher likelihood. That is, since the data output from the cumulative addition circuits 147 and 148 are each such that data of five carrier waves (1-bit data) are cumulatively added, the threshold value becomes 2.5. Meanwhile, there is a case in which the transmission parameter is rotated in a predetermined direction on a phase plane due to the state of the transmission line. In that case, unless the axis which is used as a reference is specified, the original data cannot be reconstructed accurately. Accordingly, in this embodiment, the distance from the above-described threshold value of the outputs of the cumulative addition circuits 147 and 148 is assumed to be an identification distance, and the axis with a greater identification distance is selected as the axis which will be the reference.

Assuming that a value "4" is output from the cumulative addition circuit 147 and a value "2" is output from the cumulative addition circuit 148, when these values are substituted to x of equation (1), "3" and "1" are obtained as the identification distance y, respectively. Therefore, in that case, since the output of the cumulative addition circuit 147 is greater (since the identification distance is greater), the comparison circuit 151 outputs a value "1". As a result, the selector 152 selects the output value of the cumulative addition circuit 147 and supplies the value to the majority decision circuit 153.

The majority decision circuit 153 converts the value output from the selector 152 into 1-bit data by using a predetermined threshold value (for example, 2.5) as a reference and outputs the data. In the earlier example, since a value "4" is output from the selector 152, a value "1" is output because 4>2.5. In contrast, when the output of the selector 152 is smaller than "2.5", the majority decision circuit 153 outputs a value "0".

According to the foregoing embodiment, a hard determination of each of the real-number part and the imaginary-number part of the transmission parameter is made and then differentially decoded, the cumulative addition of the obtained data is determined, the data with a greater identification distance is selected as the data with a higher likelihood, and thus a majority decision is performed. Therefore, a multiplication circuit can be omitted, and as a result, it is possible to reduce the scale of the circuits to smaller than that of the conventional case.

Figure 5:
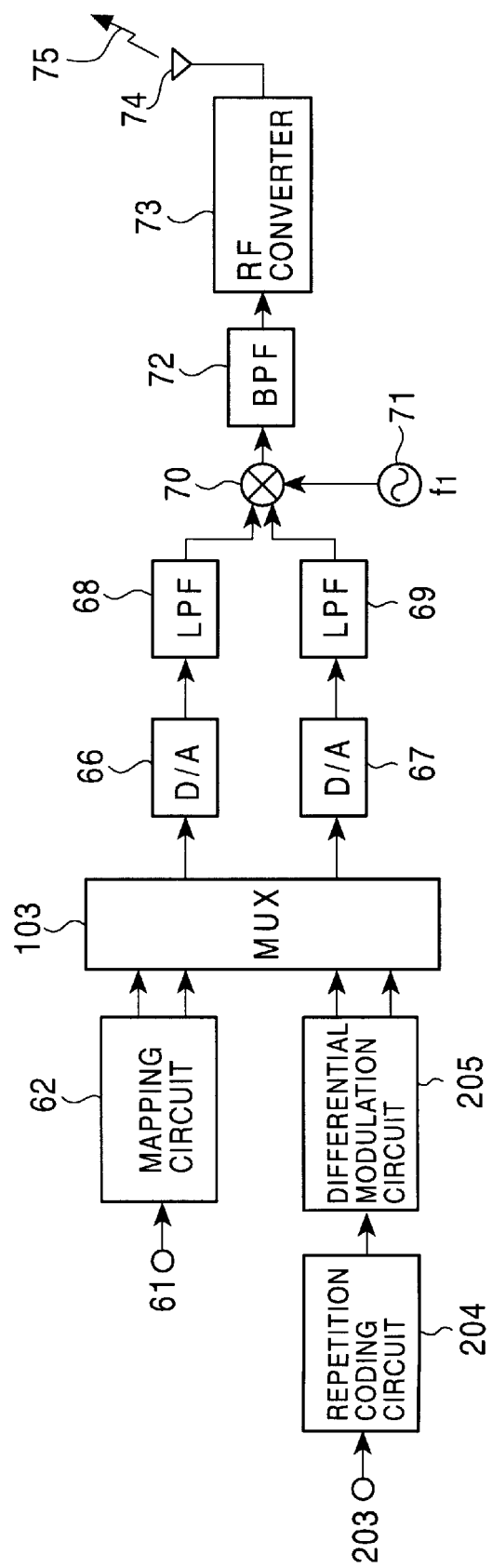
FIG. 5 is a block diagram showing a detailed example of the construction of a transmission apparatus corresponding to a second embodiment of a receiving apparatus of the present invention.

FIG. 5 is a block diagram showing an example of the construction of a transmission apparatus corresponding to a second embodiment of the receiving apparatus of the present invention. In this embodiment, the design is made such that information is transmitted in accordance with a single-carrier transmission method (a method for transmitting information by using a single-carrier wave). In this figure, components corresponding to those of FIG. 14 are given the same reference numerals and therefore, a description thereof has been omitted.

Figure 14:
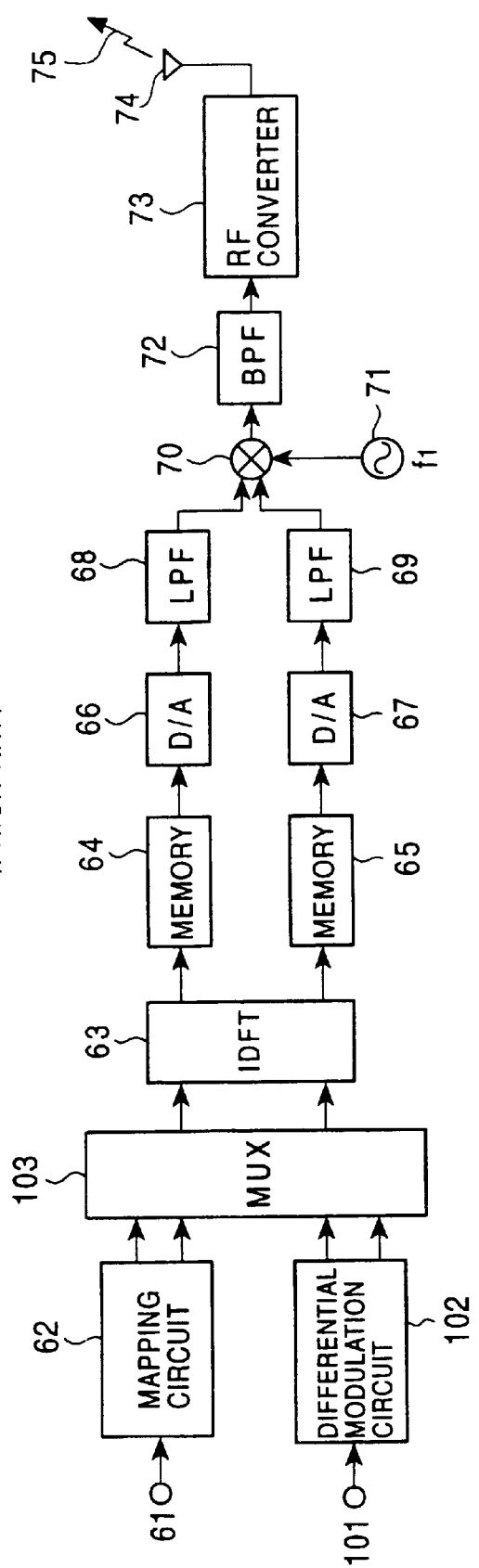
FIG. 14 is a block diagram showing an example of the construction of an OFDM transmission apparatus containing a transmission parameter.
Figure 15:
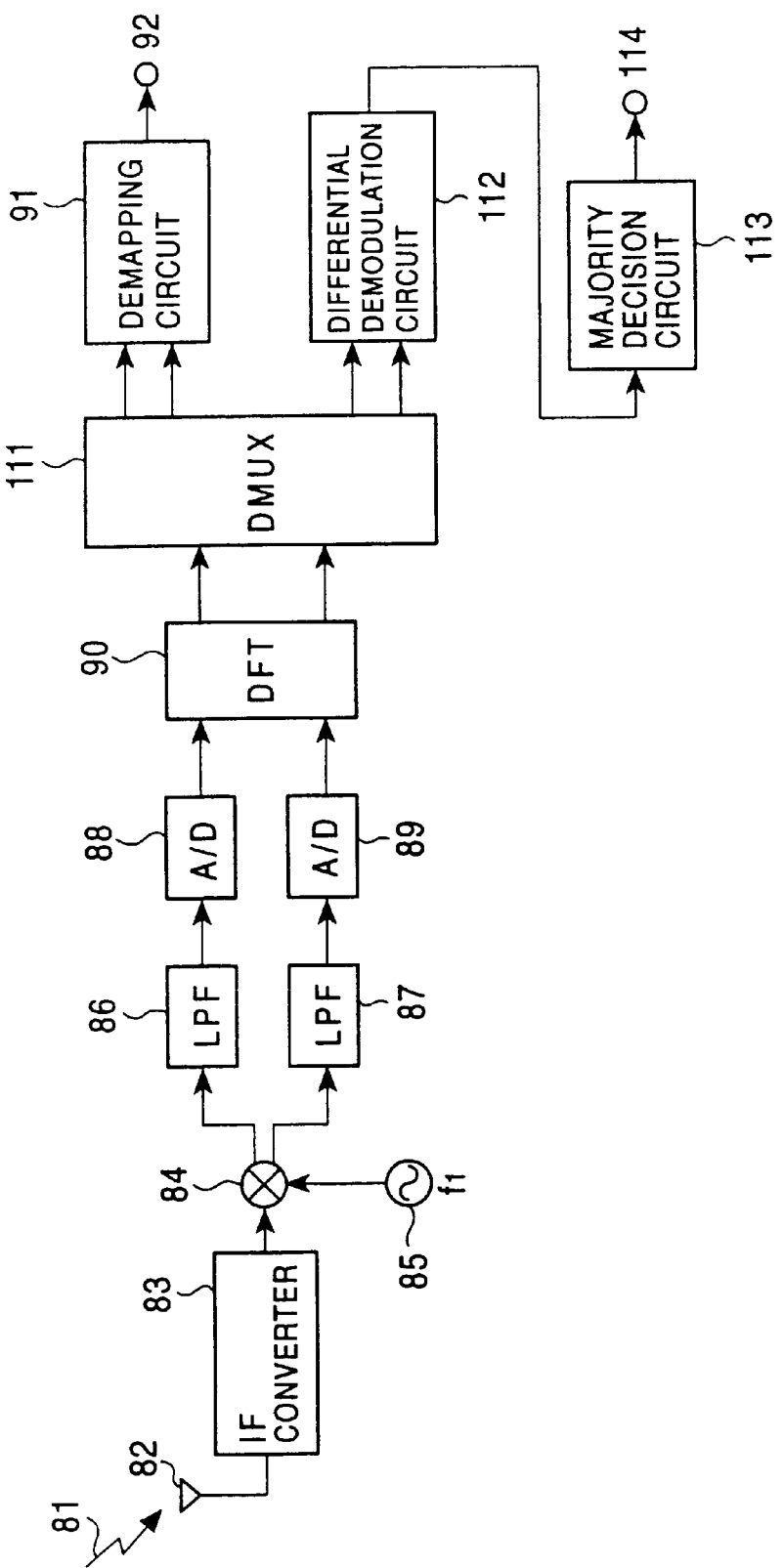
FIG. 15 is a block diagram showing an example of the construction of an OFDM receiving apparatus containing a transmission parameter.
Figure 16:
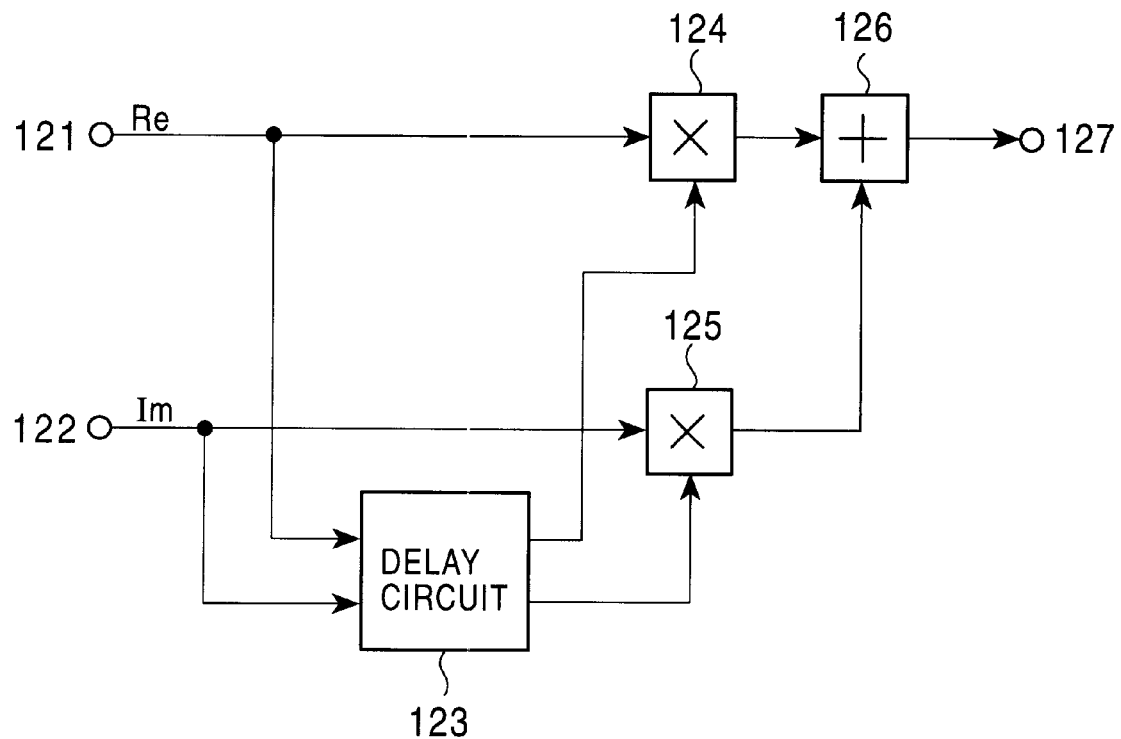
FIG. 16 is a block diagram showing an example of the construction of a differential demodulation circuit shown in FIG. 15.

In the embodiment shown in FIG. 5, the IDFT circuit 63, the memories 64 and 65, and the differential modulation circuit 102 have been removed from the construction shown in FIG. 14, and a repetition coding circuit 204 and a differential modulation circuit 205 are newly added. The remaining construction is the same as in the case shown in FIG. 14.

The repetition coding circuit 204 is designed to repeatedly code the input transmission parameter. In this example, the repetition number is set to 5.

The differential modulation circuit 205 is designed to assign the transmission parameter which is repeatedly coded by the repetition coding circuit 204 to the signal point of differential BPSK.

Figure 6:
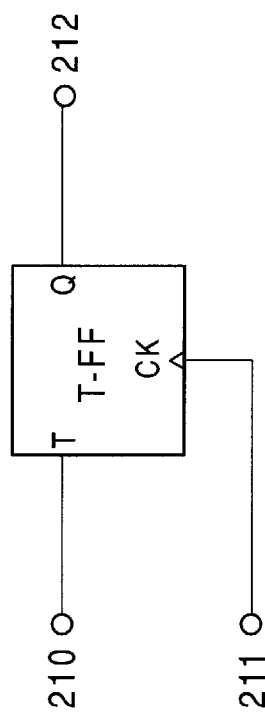
FIG. 6 is a block diagram showing a detailed example of the construction of a differential modulation circuit shown in FIG. 5.

FIG. 6 is a circuit diagram showing an example of the construction of the main portion of the differential modulation circuit 205. As shown in this figure, the differential modulation circuit 205 is formed of a T (Trigger) flip-flop.

The output of the repetition coding circuit 204 is input to a T terminal 210, and differentially modulated data is output from an output terminal 212 in synchronization with the clock signal applied to a clock signal terminal 211. The operation of the circuit of FIG. 6 is shown in the truth table 1 of T-FF below.

TABLE 1

| Input T | Output Q(n) |
|---------|-------------|
| 1 | $\overline{Q(n-1)}$ |
| 0 | $Q(n-1)$ |

As shown in this table, when the value input to the T terminal 210 is "1", the clock signal input to the clock terminal 211, for example, rises, the output of the output terminal 212 becomes such that the previous output value $Q(n-1)$ is inverted. Also, when the value input to the T terminal 210 is "0", the clock signal input to the clock terminal 211 rises, the output of the output terminal 212 becomes the same value as the previous output value $Q(n-1)$. In this example, since differential BPSK modulation is used, the Q-axis components are always set to "0".

The MUX 103 places the data mapped by the mapping circuit 62, for example, to a signal point, such as 16QAM, and the data output from the differential modulation circuit 205 along the time axis in accordance with the frame structure (the details of which will be described later).

The D/A conversion circuits 66 and 67 are designed to convert the data of the I axis and the Q axis output from the MUX 103 into corresponding analog signals and output the signals. The LPFs 68 and 69 are designed to remove the folded components contained in the outputs of the D/A conversion circuits 66 and 67.

The orthogonal modulation circuit 70 is designed to multiply the outputs of the LPFs 68 and 69 with the signal of a frequency $f_1$ output from the local oscillation circuit 71 and output it. The BPF 72 is designed to cause only the signal of a predetermined frequency band of the output of the orthogonal modulation circuit 70 to be selectively passed therethrough. The RF converter 73 is designed to convert the output signal of the BPF 72 into a signal in the RF band. The antenna 74 is designed to transmit the output of the RF converter 73.

Next, the operation of the foregoing embodiment will be described.

The digital input signal 61 input to the mapping circuit 62 is assigned to the signal point of a multi-valued modulation method, such as 16QAM. Then, the obtained I-axis and Q-axis data is supplied to the MUX 103.

Meanwhile, a transmission parameter 203 input to the repetition coding circuit 204 is coded repeatedly for five times, and the obtained data is input to the differential modulation circuit 205.

In the differential modulation circuit 205, coding is performed so that the difference value between the data to be output newly and the data which was output previously corresponds to the value output from the repetition coding circuit 204. That is, when the input data is "0", data having the same value as that of the data which was output previously is output. Also, when the input data is "1", data different from the data which was output previously is output (for example, in the case when "0" was output in the previous case, "1" is output).

Figure 7:
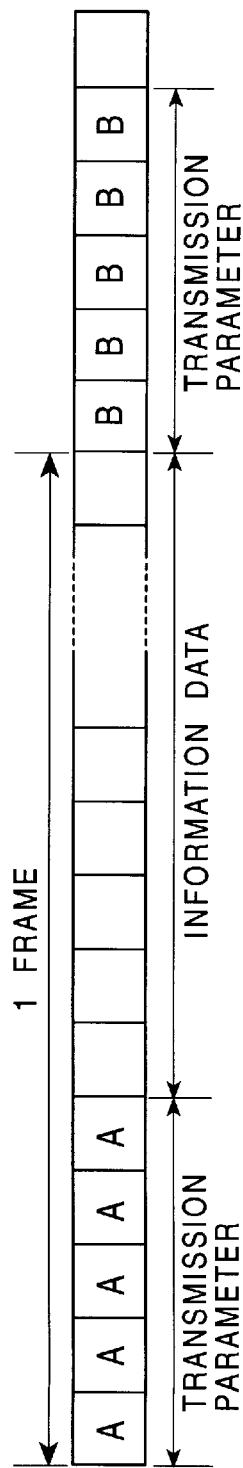
FIG. 7 is a view showing the frame structure of data output from a MUX shown in FIG. 5.

The MUX 103 places the output of the mapping circuit 62 and the output of the differential modulation circuit 205 along the time axis in accordance with the data frame structure. FIG. 7 shows the frame structure of data output from the MUX 103. As shown in this figure, the same five transmission parameters are placed repeatedly at the beginning of one frame, and following this, information data is placed.

The D/A conversion circuits 66 and 67 convert the I-axis data and the Q-axis data output from the MUX 103 into corresponding analog signals, respectively. Then, after the folded components of the output signals of the D/A conversion circuits 66 and 67 are removed by the LPFs 68 and 69, respectively, the signals are input to the orthogonal modulation circuit 70.

The orthogonal modulation circuit 70 multiplies the output of the LPFs 68 and 69 with the signal of a frequency $f_1$ output from the local oscillation circuit 71, and orthogonally modulates and outputs it. The BPF 72 causes only the signal of a predetermined frequency band from among the output signals of the orthogonal modulation circuit 70 to be passed therethrough, and supplies the signal to the RF converter 73. The RF converter 73 converts the signal output from the BPF 72 into a signal in the RF band, and transmits the signal via the antenna 74.

Figure 8:
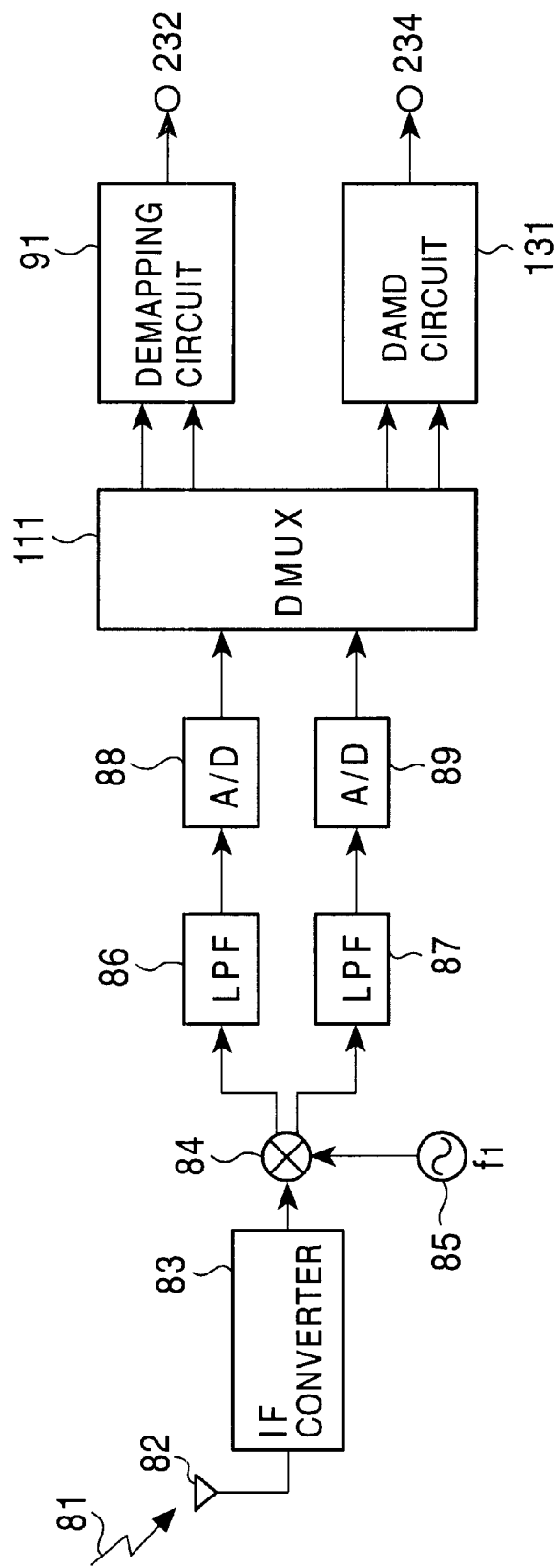
FIG. 8 is a block diagram showing an example of the construction of the second embodiment of the receiving apparatus of the present invention.
Figure 9:
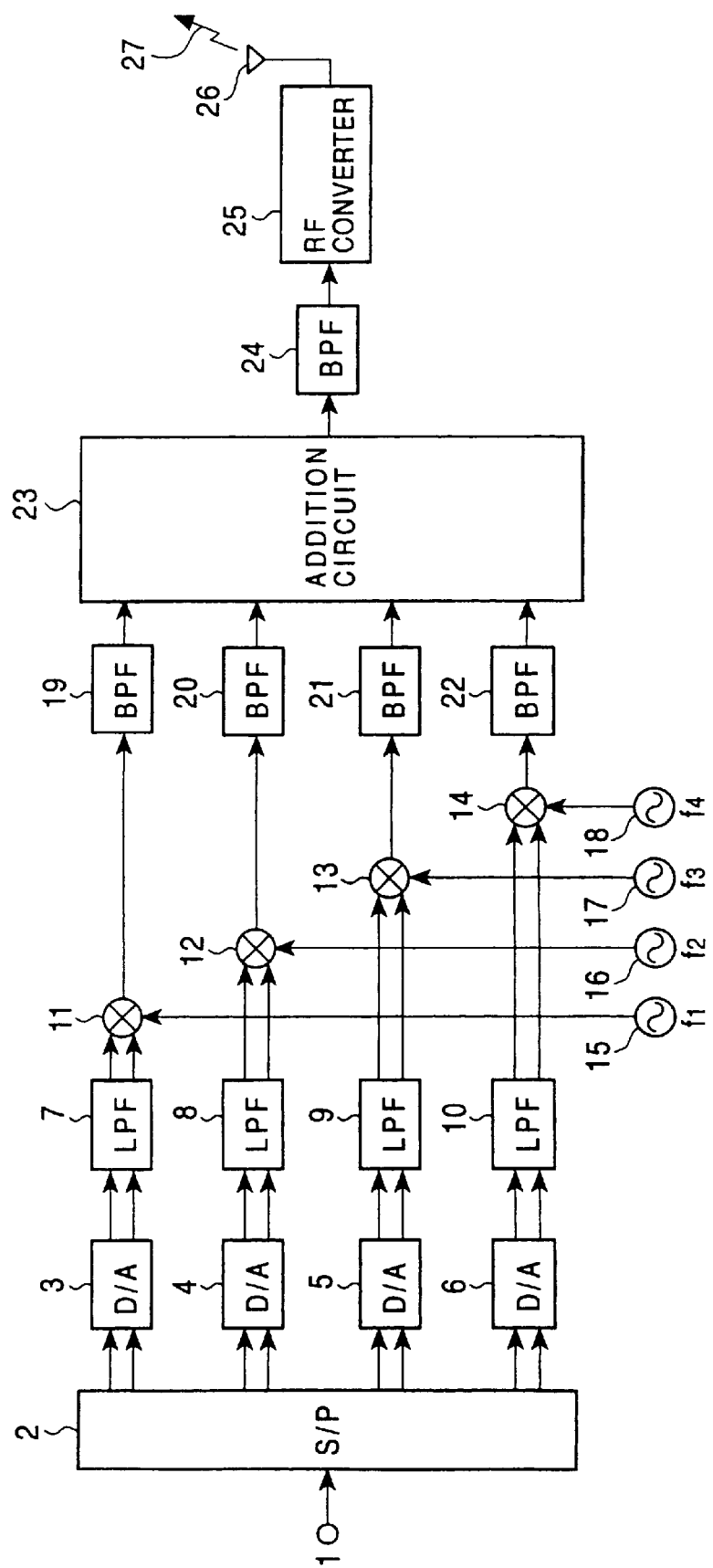
FIG. 9 is a block diagram showing an example of the construction of a conventional multicarrier transmission apparatus.
Figure 10:
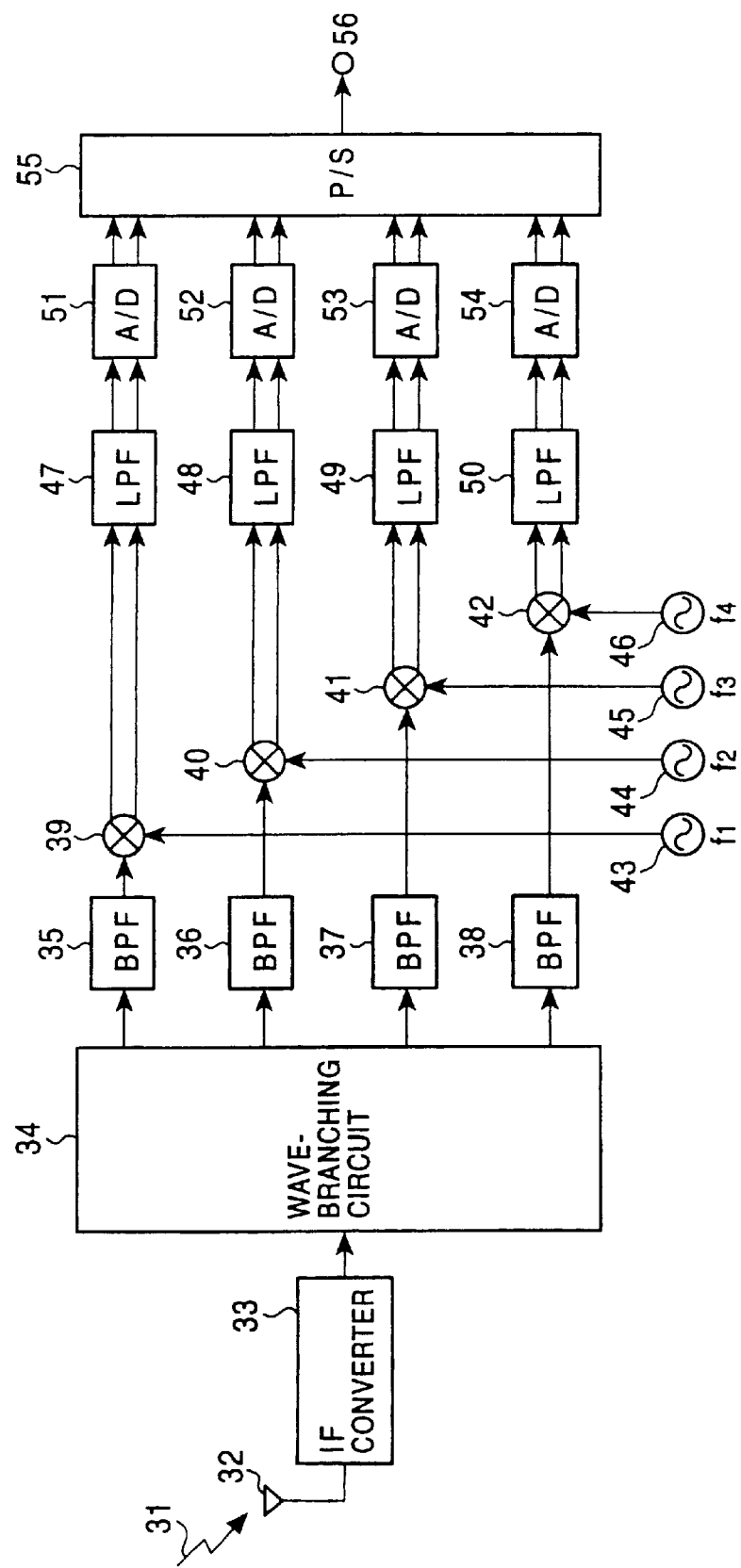
FIG. 10 is a block diagram showing an example of the construction of a conventional multicarrier receiving apparatus.
Figure 11:
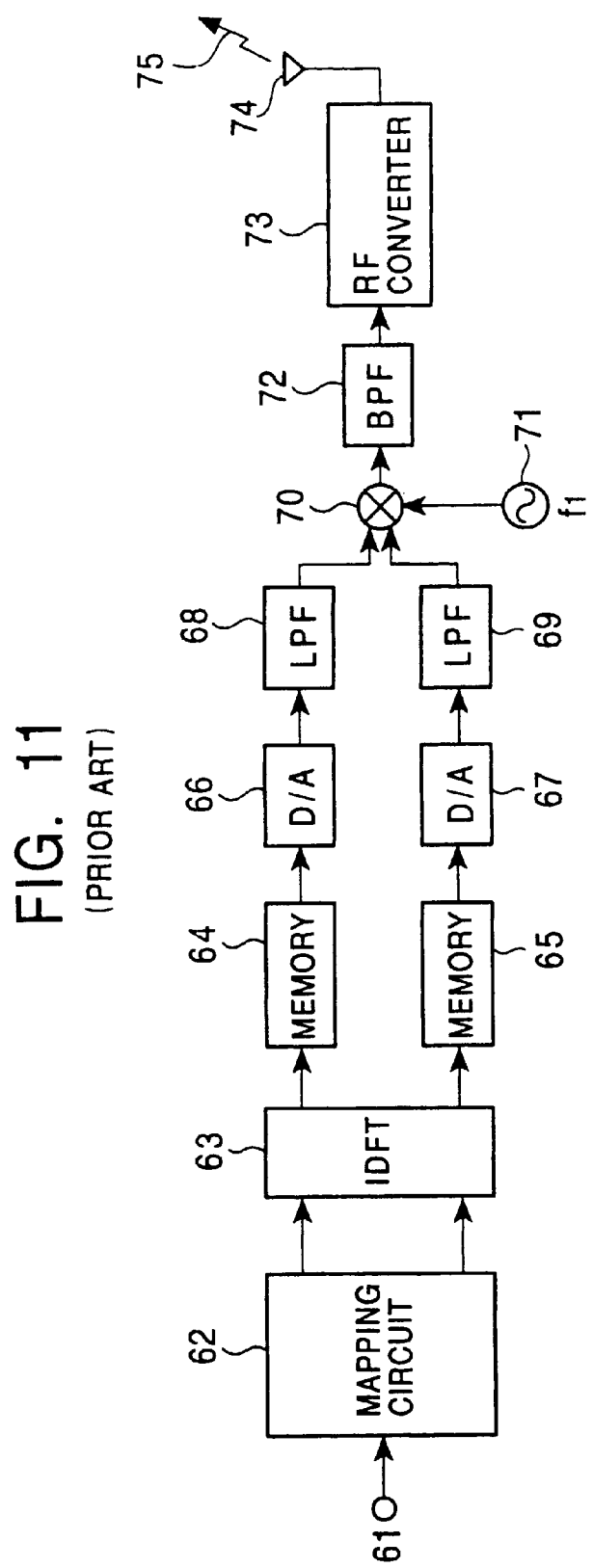
FIG. 11 is a block diagram showing an example of the construction of a conventional OFDM transmission apparatus.
Figure 12:
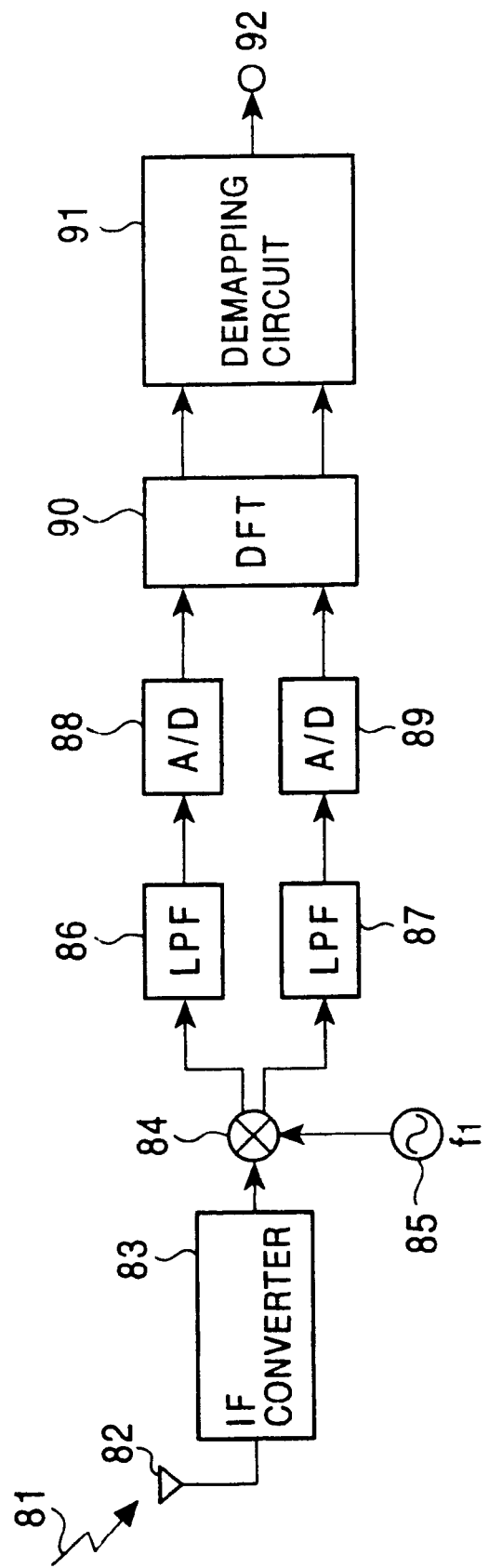
FIG. 12 is a block diagram showing an example of the construction of a conventional OFDM receiving apparatus.
Figure 13:
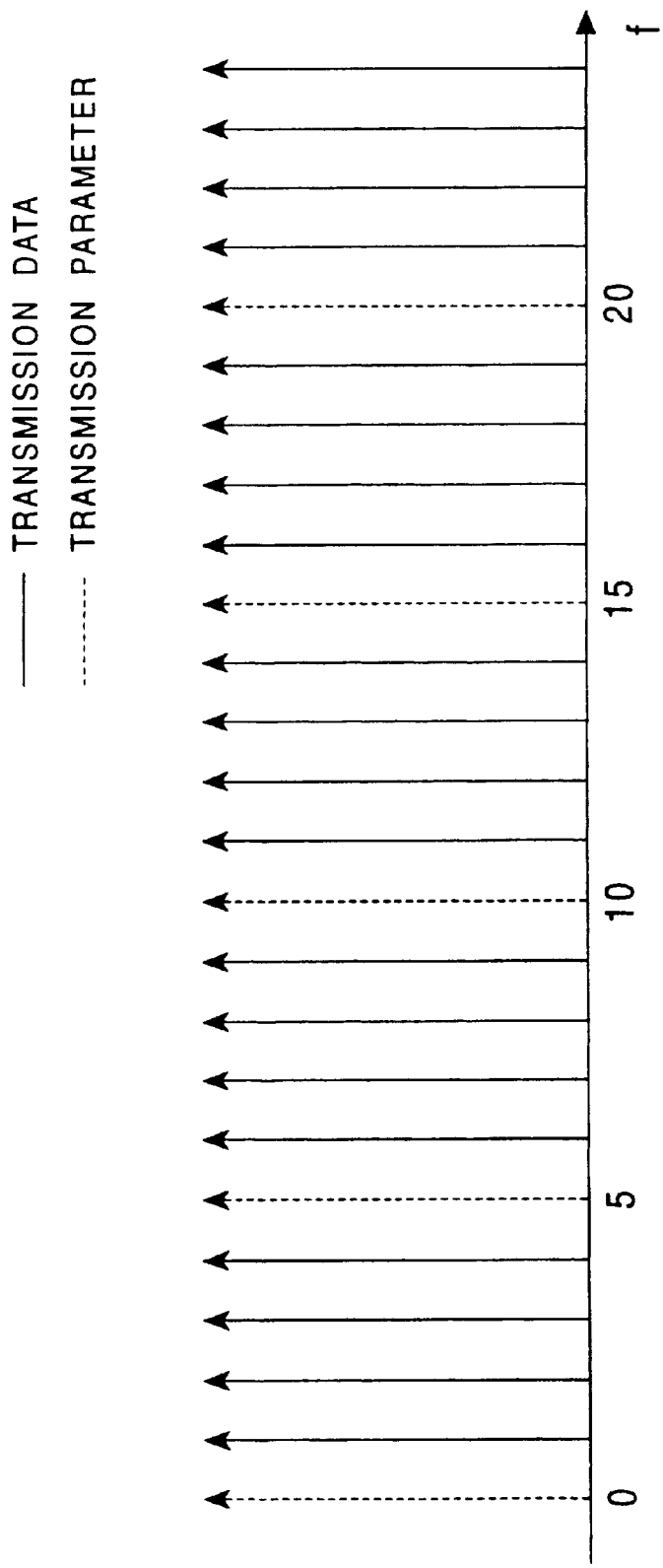
FIG. 13 is a view illustrating an example of the construction of a subcarrier to which a transmission parameter is inserted.

FIG. 8 is a block diagram showing an example of the construction of the second embodiment of the receiving apparatus of the present invention.

In this figure, components corresponding to those of FIG. 1 are given the corresponding reference numerals and therefore, a description thereof has been appropriately omitted. In this embodiment, in comparison with the case of FIG. 1, the DFT 90 has been removed. The remaining construction is the same as in the case of FIG. 1.

Next, the operation of the embodiment shown in FIG. 8 will be described.

An RF signal received by an antenna 81 is converted into a signal in an intermediate frequency band by the IF converter 83 and is output. The orthogonal demodulation circuit 84 multiplies the signal of the intermediate frequency band output from the IF converter 83 with the signal of a frequency $f_1$, orthogonally demodulates the signal, and outputs the signals of the I-axis components and the Q-axis components obtained as a result to the LPFs 86 and 87, respectively.

The LPFs 86 and 87 remove the high-frequency components contained in the I-axis components and the Q-axis components and supply them to the A/D conversion circuits 88 and 89, respectively. The A/D conversion circuits 88 and 89 convert the output signals of the LPFs 86 and 87 into corresponding digital data and supply them to the DMUX 111.

The DMUX 111 separates and extracts the transmission data and the transmission parameter from the I-axis data and the Q-axis data output from the A/D conversion circuits 88 and 89, and the transmission data is supplied to the demapping circuit 91 and the transmission parameter is supplied to the DAMD circuit 131.

The demapping circuit 91 reproduces transmission data by demapping (receiving-point identification) the I-axis and Q-axis data output from the DMUX 111.

The DAMD circuit 131 causes the hard determination circuits 143 and 144 to make a hard determination of the I-axis data and the Q-axis data of the transmission parameter output from the DMUX 111 for each time slot, respectively, and to convert the data into 1-bit data, and the data is differentially decoding by the differential decoding circuits 145 and 146.

The differentially decoded data is cumulatively added by the cumulative addition circuits 147 and 148 over the period of the 1OFDM symbol and supplied to the identification-distance measurement circuits 149 and 150, respectively, and also supplied to the selector 152.

The identification-distance measurement circuits 149 and 150 measure the identification distance of the outputs of the cumulative addition circuits 147 and 148, respectively, and output the obtained value to the comparison circuit 151. The comparison circuit 151 compares the outputs of the identification-distance measurement circuits 149 and 150. When the output of the identification-distance measurement circuit 149 is greater than or equal to the output of the identification-distance measurement circuit 150 ($I \geq Q$), the comparison circuit 151 outputs a value "1". Also, when the output of the identification-distance measurement circuit 149 is less than the output of the identification-distance measurement circuit 150 ($I<Q$), the comparison circuit 151 outputs a value "0".

When the output of the comparison circuit 151 is "1" (in the case of $I \geq Q$), the selector 152 selects the real-number components (the I-axis components) output from the cumulative addition circuit 147 and outputs them to the majority decision circuit 153. Also, when the output of the comparison circuit 151 is "0" (in the case of $I<Q$), the selector 152 selects the imaginary-number components (the Q-axis components) output from the cumulative addition circuit 148 and outputs them to the majority decision circuit 153.

The majority decision circuit 153 makes a majority decision of the data output from the selector 152 and reproduces the transmission parameter.

According to the foregoing embodiment, since the multiplication circuit is not required, it is possible to reduce the scale of circuits.

Also, on the receiving side, when orthogonal demodulation is performed by a carrier wave with a phase different from that of the carrier wave of the transmission side, the received-signal point causes phase rotation to occur on the complex plane, and data cannot be reproduced accurately. However, since an axis with a greater distance from the identification point of a repetition code is selected from among a plurality of orthogonal axes, and a majority decision is made to decode data, it is possible to reproduce data accurately even in such a case.

According to the receiving apparatus and the receiving method of the present invention, an orthogonally modulated information sequence is received, the received information sequence is orthogonally demodulated in accordance with predetermined orthogonal axes, an axis with the highest likelihood is selected by referring to the components of each axis contained in the demodulated information sequence, and the information sequence is reproduced by using the components corresponding to the selected axis. Thus, it is possible to remove the multiplication circuit, and as a result, it is possible to reduce the scale of circuits.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A receiving apparatus for receiving an orthogonally modulated information sequence, comprising:

receiving means for receiving said orthogonally modulated information sequence;

demodulation means for orthogonally demodulating said information sequence received by said receiving means in accordance with predetermined orthogonal axes;

selection means for selecting an axis with the highest likelihood by referring to the components of each axis contained in the information sequence demodulated by said demodulation means; and reproduction means for reproducing said information sequence by using the components corresponding to the axis selected by said selection means.

2. A receiving apparatus according to claim 1, wherein said information sequence is coded repeatedly, said apparatus further comprising computation means for computing, for each axis, the distance between a threshold value and said information sequence, and said selection means selects an axis with the highest likelihood by using the distance computed by said computation means between said threshold value for each axis and said information sequence.

3. A receiving apparatus according to claim 2, wherein said information sequence is such that the same information is added to a plurality of subcarriers and is coded repeatedly on the basis of multicarrier transmission.

4. A receiving apparatus according to claim 2, wherein said information sequence is such that the same information is added to a plurality of time slots and is coded repeatedly.

5. A receiving apparatus according to claim 2, wherein said information sequence is differentially modulated, and there is further provided decoding means for decoding, for each axis, the components of each axis contained in the information sequence demodulated by said demodulation means; and wherein said reproduction means is operative to make a majority decision of information corresponding to the axis selected by said selection means from among information which is differentially decoded by said decoding means.

6. A receiving method for receiving an orthogonally decoded information sequence, comprising:

a receiving step for receiving said orthogonally modulated information sequence;

a demodulation step for orthogonally demodulating said information sequence received in said receiving step in accordance with predetermined orthogonal axes;

a selection step for selecting an axis with the highest likelihood by referring to the components of each axis contained in the information sequence demodulated in said demodulation step; and a reproduction step for reproducing said information sequence by using the components corresponding to the axis selected in said selection step.

7. A receiving apparatus for receiving an orthogonally modulated information sequence, comprising:

an input circuit comprising an antenna and an IF converter for receiving said orthogonally modulated information sequence;

an orthogonal demodulator for orthogonally demodulating said information sequence received by said input circuit in accordance with predetermined orthogonal axis;

a comparator having first and second inputs for receiving signals representing first and second distances between a threshold value and each axis of said orthogonal axes and an output for outputting a signal having a value based on a comparison of said distances; and a selector having first and second inputs for receiving each said axis, a control input connected to said output of said comparator, and an output for outputting said axis with the highest likelihood based on said control input signal from said comparator.

8. A receiving apparatus according to claim 7, further comprising first and second distance measurement circuits to compute said first and second distances, said distance measurement circuits each having an input to receive input data associated with one said axis and an output connected to one said input of said comparator.

9. A receiving apparatus according to claim 7, wherein said information sequence is coded repeatedly.

10. A receiving apparatus according to claim 9, wherein said information and sequence is such that the same information is added to a plurality of subcarriers and is coded repeatedly on the basis of multicarrier transmission.

11. A receiving apparatus according to claim 9, wherein said information sequence is such that the same information is added to a plurality of time slots and is coded repeatedly.

12. A receiving apparatus according to claim 9, wherein said information sequence is differentially modulated and said receiving apparatus further comprises a decoding circuit for decoding, for each axis, the components of each axis contained in said information sequence demodulated by the demodulator, and a majority decision circuit for making a majority decision of information corresponding to the axis selected by the selector from among the information which is differentially decoded by said decoding circuit.

* * * * *

UNITED STATES PATENT AND TRADEMARK OFFICE
CERTIFICATE OF CORRECTION

PATENT NO. : 6,169,768 B1
DATED : January 2, 2001
INVENTOR(S) : Okada et al.

Page 1 of 1

It is certified that error appears in the above-identified patent and that said Letters Patent is hereby corrected as shown below:

Column 5,
Line 63, cancel "information sequence".

Column 14,
Line 34, "information and sequence" should read -- information sequence --.

Signed and Sealed this

Twenty-fifth Day of September, 2001

Attest:

*Attesting Officer*

NICHOLAS P. GODICI
*Acting Director of the United States Patent and Trademark Office*